United States Patent [19]

Sommerer et al.

[11] Patent Number: 4,677,731
[45] Date of Patent: Jul. 7, 1987

[54] PROCESS AND DEVICE FOR MOUNTING POROUS CERAMIC MATERIAL

[75] Inventors: Jürgen Sommerer, Rauenthal; Michael Leipold; Hartmut Kainer, both of Wiesbaden; Hermann Stein, Taunusstein, all of Fed. Rep. of Germany

[73] Assignee: Didier-Werke AG, Wiesbaden, Fed. Rep. of Germany

[21] Appl. No.: 733,867

[22] Filed: May 14, 1985

[30] Foreign Application Priority Data

May 25, 1984 [DE] Fed. Rep. of Germany ....... 3419566

[51] Int. Cl.⁴ .............................................. F16L 59/12
[52] U.S. Cl. .................................... 29/526 R; 29/456; 138/147; 138/149; 285/47
[58] Field of Search ......... 29/400 M, 163.5 F, 402.09, 29/402.12, 402.03, 402.14, 402.15, 402.16, 402.17, 419 R, 456, 462, 526 R; 285/47, 53, 54; 411/392; 138/147, 149, 153, 158, 159, 160; 220/413

[56] References Cited

U.S. PATENT DOCUMENTS

| | | | |
|---|---|---|---|
| 218,340 | 8/1879 | Toope | 138/147 |
| 388,260 | 8/1888 | Carey | 285/47 X |
| 754,256 | 3/1904 | Sullivan | 285/47 |
| 1,411,386 | 4/1922 | Sodergreen | 285/47 |
| 1,864,923 | 6/1932 | Mesmer | 29/526 X |
| 1,972,508 | 9/1934 | Zeiner | 138/147 |
| 3,170,223 | 2/1965 | Doerer | 29/419 X |
| 3,487,533 | 1/1970 | Ström | 29/526 X |
| 3,955,600 | 5/1976 | Tamburello | 138/153 X |
| 4,437,286 | 3/1984 | Maguire | 411/392 X |

FOREIGN PATENT DOCUMENTS

| | | | |
|---|---|---|---|
| 830275 | 7/1949 | Fed. Rep. of Germany | 138/149 |
| 2243995 | 3/1973 | Fed. Rep. of Germany | . |
| 3015745 | 10/1981 | Fed. Rep. of Germany | . |
| 1060740 | 4/1954 | France | 138/149 |
| 118947 | 3/1970 | Norway | 411/392 |

Primary Examiner—Howard Goldberg
Assistant Examiner—Joseph M. Gorski
Attorney, Agent, or Firm—Nils H. Ljungman

[57] ABSTRACT

This invention relates to mounting porous ceramic material to metal surfaces. The metal surfaces may either be flat surfaces or tubes. The ceramic material is held onto a perforated metal sheet by screwed-in spiral springs. The perforated metal sheet acts as a holding device and is located adjacent to a metal surface. The invention provides for porous ceramic insulation which is conveniently mounted with relation to the metal surface. Spiral springs absorb the stresses which occur during use.

15 Claims, 9 Drawing Figures

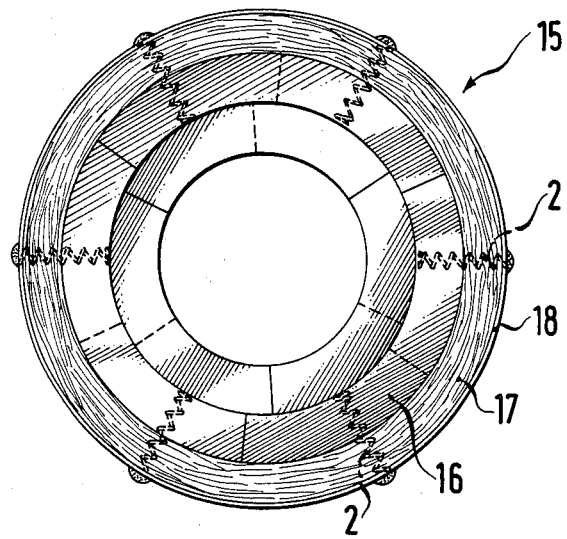
FIG. 8
FIG. 9
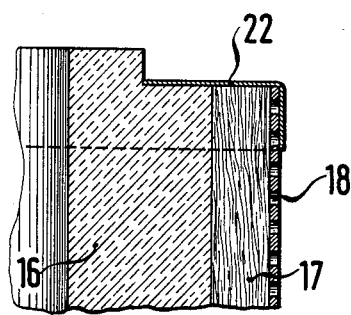

PROCESS AND DEVICE FOR MOUNTING POROUS CERAMIC MATERIAL

BACKGROUND OF THE INVENTION

1. Field of the Invention:

This invention relates to a process for mounting porous ceramic material for use as insulation material for metal surfaces, including not only flat metal surfaces such as walls, roofs and doors, but also curved metal surfaces such as the interior of metal tubes.

2. Description of the Prior Art:

Insulation often must be fastened or otherwise located adjacent to metal surfaces which are exposed to high temperatures. The processes known up to now, such as adhesives, pins welded to metal surfaces, etc., have poor stability of the insulational walls as a result of temperature induced stresses. Moreover, the attachment of the support apparatus takes an extraordinary amount of time.

OBJECT OF THE INVENTION

The object of the present invention is to provide a process to mount insulation material for metal surfaces in a simple manner, and which also assures long-term stability under load.

SUMMARY OF THE INVENTION

This invention uses spiral springs which are turned or screwed into a porous ceramic insulation material. One end of each of the spiral springs (the end towards the metal surface) passes through a perforated metallic sheet, such as wire mesh. The perforated metal sheet is located between the metal surface and the ceramic material. The porous ceramic and the perforated metal sheet are held together by the spiral springs, that is, one portion of each spiral spring passes through the perforated metal sheet, while another portion of each spiral spring is in the porous ceramic. As used herein, the term "perforated" means having holes or passages, including holes formed by weaving, as in a woven wire grid.

The porous ceramic is used to provide insulation for the metal surface. The porous ceramic is directly or indirectly adjacent to the perforated metal sheet (a fiber mat may be disposed therebetween), and the perforated metal sheet is located adjacent to the metal surface. This can be done, for example, by spot welding wire mesh to the metal surface, or by inserting a cylindrical multiple-piece porous ceramic, with a perforated metal sheet wrapped around it, into the interior of a tube. Spiral springs are screwed into the porous ceramic and also into the perforated metal sheet. These springs are screwed into one material, with the leading end going through into the other material (starting with either the porous ceramic or the perforated metal sheet, depending upon the configuration). This provides for convenient mounting of the porous ceramic with relation to the metal surface, and the spiral springs absorb stress during use.

BRIEF DESCRIPTION OF THE DRAWINGS

The invention can be best understood by reference to the following drawings, in which:

FIG. 8 shows a cross section of an insulated tube; and

FIG. 9 shows a section of a tube with a flow lock.

DESCRIPTION OF THE PREFERRED EMBODIMENTS

Figure 1:
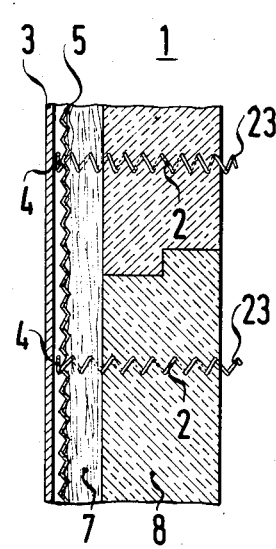
FIG. 1 shows one embodiment of wall insulation.

In one embodiment, the process comprises the spot welding of a perforated metal sheet to a piece of metal wall to be insulated. A layer of fiber mat is placed adjacent to the perforated metal sheet and a layer of multiple porous ceramic fiber bricks is located adjacent to the fiber mat. At approximately uniform intervals, spiral springs are screwed through the porous ceramic fiber brick, for example, by means of a drill provided for the purpose, until the ends of the spiral springs have passed through the porous ceramic fiber brick through the fiber mat, and are engaged in the perforated metal sheet. The perforated metal sheet has openings, and can comprise, for example, a rib mesh, a perforated plate, a wire mesh or a wire grid. The hardness of the porous ceramic fiber bricks and the spiral spring material is selected so that when the springs are screwed into the brick, a small spiral-shaped hole is formed. The space located inside the spring remains filled up by brick and is not disturbed during the insertion process. The strength with which the insulation is held to the wall is thereby significantly increased. This process is suitable both for flat walls, such as roofs and doors, and for external or internal insulation of metal tubes. The spiral springs absorb the thermally-induced stresses. Gaps which could occur if there were a fixed connection between the metal surface and the insulation are eliminated. As a result, long service lives can be achieved by this invention.

In one preferred embodiment, there are recesses in the porous ceramic fiber bricks (on the side of the brick opposite the metal surface) into which the spiral springs are introduced. After the spiral springs are screwed in, the recesses can be plugged up with filler material.

Abbreviated spiral springs can be used such that the ends of the spiral springs disappear into the recesses of the brick. The recesses can then be plugged with a refractory filler material, for example, fiber wool or mortar. Plugs can be used, either with or without additional refractory material, to provide a flush surface with the fiber bricks.

Another embodiment, which also uses recesses in the fiber bricks, utilizes stopper plugs, equipped with a head, which are inserted in the recesses. The stopper plugs can have a cylindrical head which projects from the porous ceramic and a bolt portion which fits into the recess in the fiber bricks. The bolt portion can be provided with a thread having pitch and size dimensions such that the bolt portion can be screwed into the spiral grooves left by the springs in the recess walls, or the plug bolts can be threaded and sized to mate with the interior of the spiral springs. The dimensions are preferably such that the bolt portions screw into the interior thread of the springs as this assures an additional attachment between the insulation and the metal surface. The force with which the insulation is pressed against the metal wall can be adjusted by varying how far the stopper plugs are screwed in.

In addition, the heads of at least some of the stopper plugs can exhibit grooves or graduations. The spiral springs with the stopper plugs can be approximately arranged to provide mountings on the wall insulation. The heads of the stopper plugs can be designed, for example, with a milled groove or a graduation, such that heating coils can be fastened to them.

On curved metal surfaces, such as tubes, interior covering assemblies can be placed to insulate the interior of a tube. Such assemblies can be constructed of fiber brick with a flexible perforated metal sheet wrapped around the porous fiber brick (preferably with at least one intermediate fiber mat) and with the assembly joined by screwing the spiral springs through the perforated metal sheet, through any fiber mats, and into the fiber bricks.

The interior coverings for the tube can be assembled around fiber bricks which are in a cylindrical (tubular) shape and with a perforated metal sheet on the outside. The perforated metal sheet can be equipped with hinges such that the assembly can be held together by a locking rod (pushed through the hinges). The spiral springs are screwed through the perforated metal sheet into the fiber bricks, and the spiral springs can be fastened, for example, by welding, to the perforated metal sheet. After the assembly is inserted into the tube, the locking rod can be removed.

The interior covering assembly preferably comprises several layers with the inside layer being fiber bricks assembled in a tubular manner, and around which at least one layer of fiber mat is laid. The fiber may can be soaked in water to provide a better fit. A perforated metal sheet, provided with hinges, for example, located on metal brackets on two opposite edges of the perforated metal sheet, is laid around the fiber mat. A locking rod is pushed into the hinges. Spiral springs are screwed in radially through the openings in the perforated metal sheet toward the middle of the fiber bricks at approximately equal intervals. The ends of the spiral springs can be cut off and, for example, welded to the perforated metal sheet. This prefabricated covering assembly is introduced into the tube to be insulated. Additional prefabricated covering assemblies can be introduced in a similar manner, with assemblies being located axially adjacent to one another (end to end) to insulate longer lengths of pipe.

Preferably, a cap-shaped flow lock equipped with a hole is used between the prefabricated covering assemblies to prevent back flows of the medium flowing through the tube. The flow locks can be fabricated from, for example, graphite or aluminum.

The process offers advantages in that the metal surfaces are insulated so that the stresses which can cause cracks between the ceramic insulation layer and the metal wall, such as those that are caused, for example, by temperature changes, are absorbed or eliminated. In addition, the present process offers a simple and time-saving method of applying the insulation layer to a metal surface.

FIG. 1 shows a side view of a flat wall insulation. The wall is constructed of a metal surface 3 spot welded to a perforated metal sheet 5 (which exhibits openings into which spiral springs 2 can be screwed). Attached to the metal surface 3 is a ceramic layer 1 comprising a fiber mat 7 and fiber bricks 8. The spiral springs 2 are screwed through the fiber bricks 8. The fiber bricks 8 have a porosity of 80 to 90%, and thus are soft enough to allow the spiral springs 2 to be screwed through them. The ends 4 of the spiral spring 2 facing the perforated metal sheet 5 are engaged in the perforated metal sheet 5 and hold the ceramic layer 1 in position. The opposite ends 23 (ends away from the metal wall) of the spiral springs 2 can be cut off and protected in various ways, as illustrated in FIG. 2.

Figure 2:
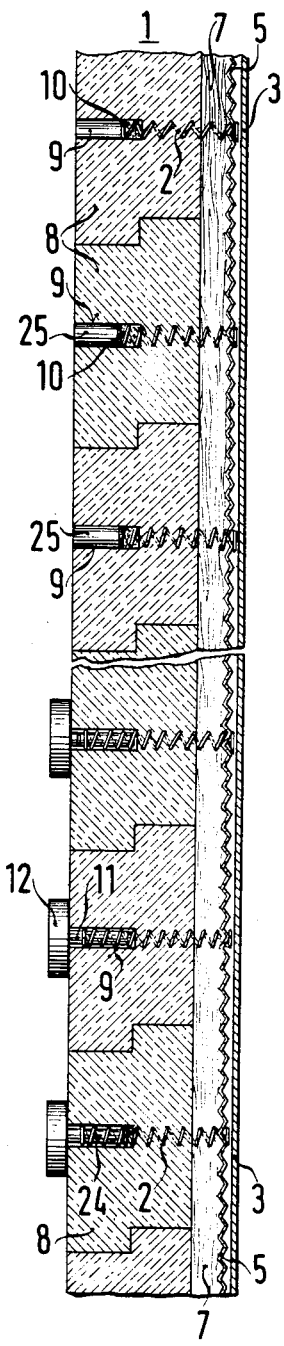
FIG. 2 shows alternate embodiments of wall insulation.

In the upper portion of FIG. 2, there are surface recesses 9 into which abbreviated springs 2 are admitted. The recesses 9 are then plugged up with filler material 10, which can comprise fiber wool or mortar, and sealed with a stopper plug 25. In the lower portion of FIG. 2, the recesses 9 for the spiral springs 2 are closed by means of a stopper plug 11, comprising a head 12 and a bolt 24. The bolts 24 of the stopper plugs 11 have the same thread pitch as the spiral springs 2, so that the spring force of the spiral springs 2, with which the ceramic 1 is to be pressed against the metal surface 3, can be adjusted.

Figure 3:
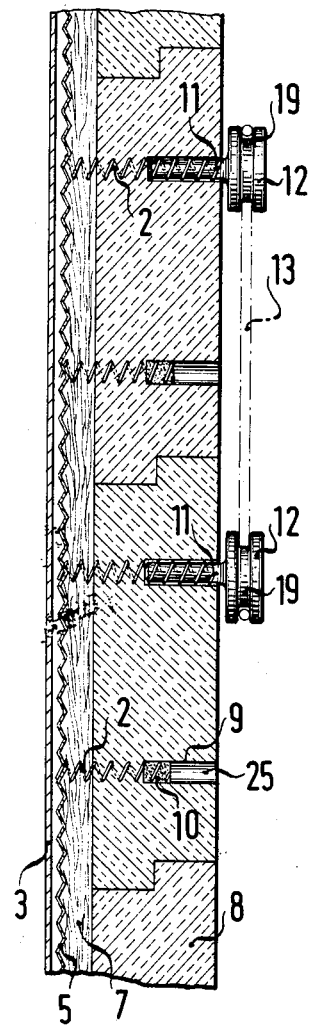
FIGS. 3 and 4 show wall insulations with heating coils.
Figure 4:
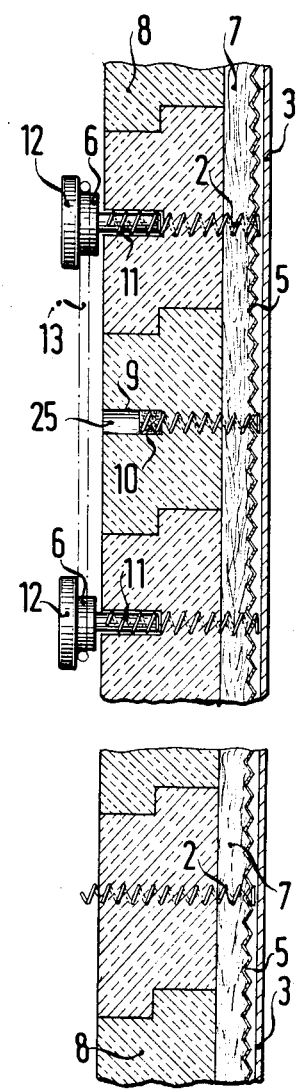

In FIGS. 3 and 4, the heads 12 of the stopper plugs 11 are designed so that a heating coil 13 can be fastened to them. The stopper plug heads 12 shown in FIG. 3 have a groove 19, and those shown in FIG. 4 have a graduation 6 to hold the heating coil 13.

Figure 5:
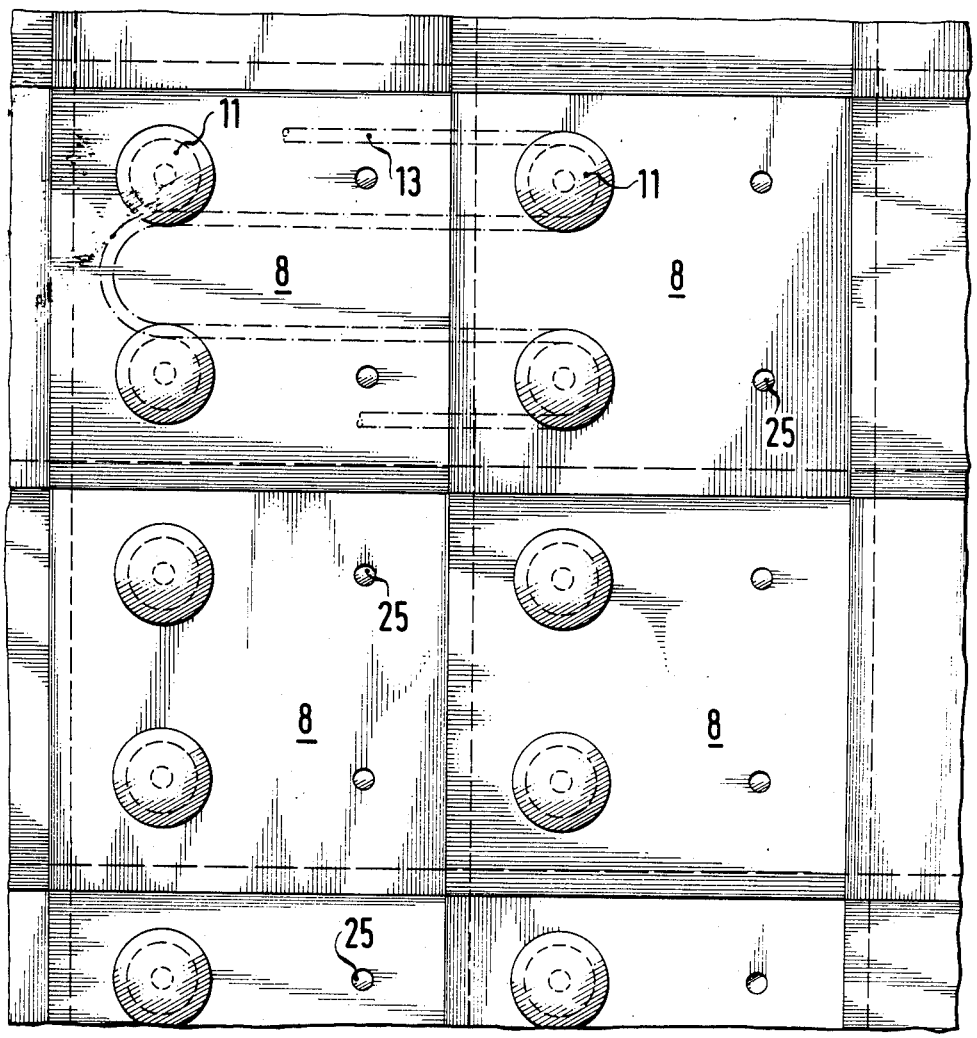
FIG. 5 shows an overhead view of a wall insulation.

FIG. 5 shows an overhead view of an insulation wall with a heating coil 13 (shown incompletely), which is laid around the stopper plugs 11, which are designed as a heating coil mounting device.

Figure 6:
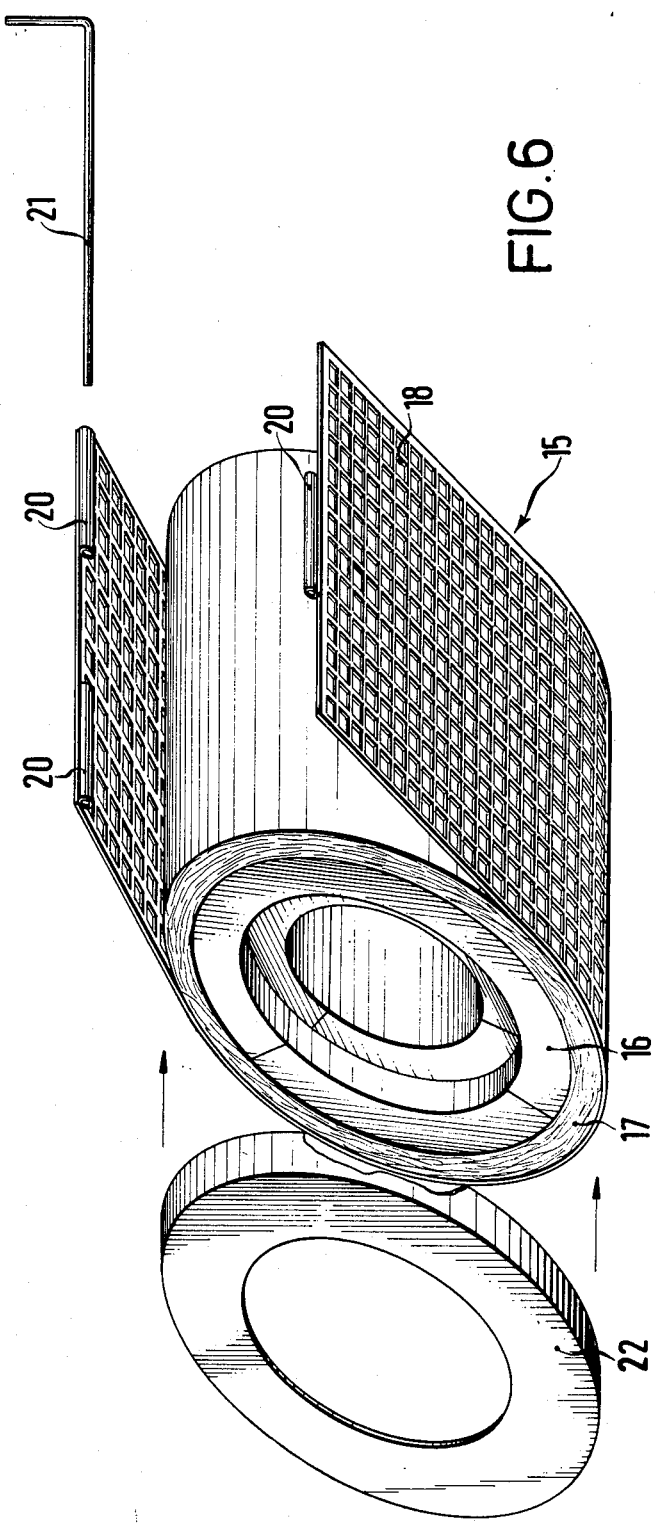
FIG. 6 shows a perspective view of an insulation assembly for insertion into a tube.
Figure 7:
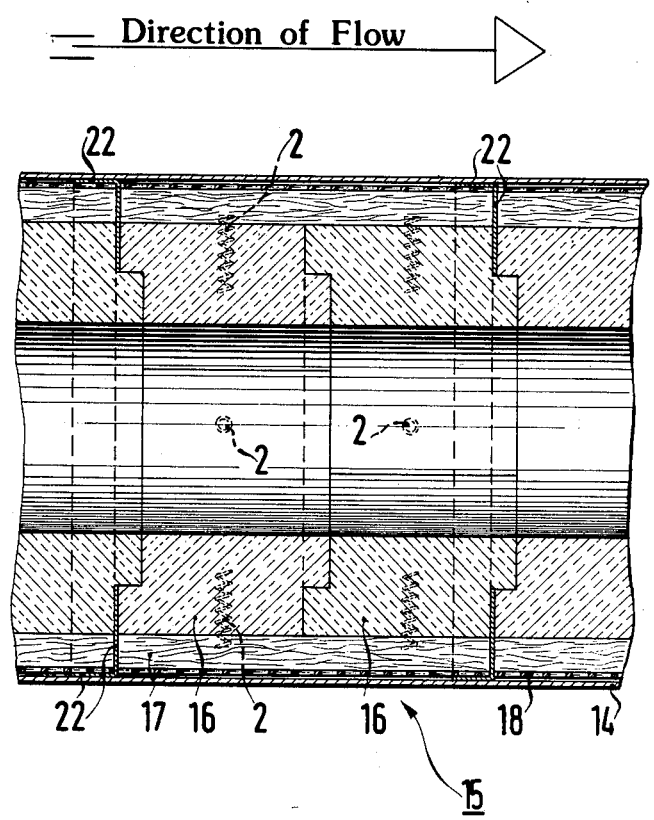
FIG. 7 shows a side view of an insulated tube.

FIG. 6 shows the construction of an interior covering 15 for the insulation of a tube (see 14 in FIG. 7). First, a tubular layer is assembled from fiber bricks 16. The fiber bricks 16 are surrounded with a fiber mat 17, which can be soaked with a fluid, for example, water. Around this fiber mat 17, a perforated metal sheet 18, provided with hinges, is laid and held in place by means of a locking rod 21.

As shown in FIGS. 7 and 8, the spiral springs 2 are screwed through the openings in the perforated metal sheet 18 in a radial direction to approximately the center of the fiber bricks 16. The ends of the spiral springs 2 can be cut off and welded to the perforated metal sheet 18. These prefabricated covering assemblies 15 are combined with one another in a tube 14 to be insulated (as shown in FIG. 7). The direction of the flow is shown by an arrow. Once the covering assembly 15 is inside the tube 14, the locking rod 21 can be removed. To prevent back flows, cup-shaped flow locks 22 can be used between the coverings. These flow locks 22 are illustrated in FIGS. 6, 7, and 9.

The invention as described hereinabove in the context of the preferred embodiments is not to be taken as limited to all of the provided details thereof, since modifications and variations thereof may be made without departing from the spirit and scope of the invention.

What is claimed is:

1. A process for mounting porous ceramic material to a metal surface to provide insulation for said metal surface, said process comprising the steps of:
   disposing a perforated holding means in fixed relationship on said metal surface;
   choosing porous ceramic material having a porosity of about 80% to about 90% and being of such hardness that spiral paths can be cut therein by spiral springs, and choosing spiral springs such that they can, on their own, cut spiral paths in the porous ceramic material when screwed thereinto;
   placing said porous ceramic material adjacent to said holding means;

cutting helical paths in said porous ceramic material with spiral springs by screwing said spiral springs into said porous ceramic material;

engaging said spiral springs with said perforated holding means by continually screwing said spiral springs, thereby attaching said porous ceramic material to said metal surface; and absorbing stresses with said spiral springs during use by deflection of said spiral springs, which stresses are at least caused by differences in thermal expansion between said porous material and said perforated holding means.

2. The process according to claim 1 wherein said perforated holding means comprises wire mesh, and wherein said step of disposing said perforated holding means comprises fastening said wire mesh to said metal surface.

3. The process according to claim 2 including the step of disposing a fiber mat between said wire mesh and said porous ceramic material.

4. The process according to claim 1 wherein said porous ceramic material comprises ceramic fiber brick, and wherein said step of cutting said helical paths comprises inserting said helical springs by slow twisting of said helical springs into said ceramic fiber brick.

5. The process according to claim 1 including the step of disposing a fiber mat between said perforated holding means and said porous ceramic material.

6. The process according to claim 1 including the steps of providing surface recesses in said porous ceramic material opposite said metal surface, screwing said spiral springs into said porous ceramic material through said recesses, and introducing stopper plugs into said recesses.

7. The process according to claim 6 including the step of providing said stopper plugs with a bolt portion which fits into said recesses and a head portion which projects from said porous ceramic material.

8. The process according to claim 7 including the steps of providing said stopper plug bolt portions with a predetermined thread pitch and size, and mating said stopper plug bolt portion with a portion of an interior thread of said spiral springs.

9. The process according to claim 8 including the step of providing said stopper plug head portions with a groove for receiving a heating coil.

10. The process according to claim 5 wherein said perforated holding means comprises wire mesh, and wherein said process includes the step of fastening said wire mesh to said metal surface by spot welding.

11. The process according to claim 5 including the step of disposing a fiber mat between said perforated holding means and said porous ceramic material.

12. The process according to claim 1 wherein said metal surface is a tube interior, with said porous ceramic material being cylindrical, and wherein said process includes the steps of:

adapting said porous ceramic material to fit inside said tube;

wrapping said perforated holding means around said porous ceramic material;

forming an assembly of said spiral springs, said porous ceramic material and said perforated holding means; and inserting said assembly into said tube.

13. The process according to claim 12 wherein said cylindrical porous cermaic material comprises multiple ceramic fiber bricks, and wherein said process includes the step of disposing a fiber mat between said cylindrical porous ceramic material and said perforated holding means.

14. The process according to claim 12 including the steps of:

providing said perforated holding means with hinges;

holding said perforated holding means temporarily in cylindrical form by pushing a locking rod through said hinges while said assembly is inserted into said tube; and removing said locking rod after said assembly has been inserted.

15. The process according to claim 1 comprising the further steps of:

placing a fiber mat adjacent to said perforated holding means;

placing said porous ceramic material adjacent to and in contact with said fiber mat;

providing said porous ceramic material with surface recesses opposite said metal surface;

wherein cutting of helical paths comprises screwing said spiral springs into said porous ceramic material, through said recesses, into said fiber mat, and into said perforated holding means thereby cutting spiral paths in said porous ceramic material and attaching said porous ceramic material to said metal surface;

introducing stopper plugs into said recesses, providing said stopper plugs with bolt portions which fit into said recesses and head portions which project from said porous ceramic material;

providing said head portions of said stopper plugs with grooves adapted to receive a heating coil, said heat portions said porous ceramic material in place and making said spiral springs absorb said stresses during use.

* * * * *